(12) United States Patent
Mizushima et al.

(10) Patent No.: US 7,576,913 B2
(45) Date of Patent: Aug. 18, 2009

(54) METHOD FOR PRODUCING POLARIZING PLATE, POLARIZING PLATE, OPTICAL FILM, AND IMAGE DISPLAY

(75) Inventors: Hiroaki Mizushima, Ibaraki (JP); Megumi Katou, Ibaraki (JP); Mizue Nagata, Ibaraki (JP); Takaaki Ishii, Ibaraki (JP); Daisuke Ogomi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 15 days.

(21) Appl. No.: 11/938,968

(22) Filed: Nov. 13, 2007

(65) Prior Publication Data

US 2008/0112047 A1    May 15, 2008

(30) Foreign Application Priority Data

Nov. 14, 2006    (JP)    ............................. 2006-308112

(51) Int. Cl.
*G02B 5/30*    (2006.01)
(52) U.S. Cl. ..................................... 359/494
(58) Field of Classification Search ....................... None
See application file for complete search history.

(56) References Cited

U.S. PATENT DOCUMENTS

| | | | | |
|---|---|---|---|---|
| 2006/0082708 A1* | 4/2006 | Nagase et al. | ................ | 349/124 |
| 2006/0268200 A1* | 11/2006 | Ohgaru et al. | ................. | 349/97 |
| 2007/0081115 A1* | 4/2007 | Wada et al. | .................... | 349/96 |
| 2007/0195226 A1* | 8/2007 | Aminaka et al. | .............. | 349/96 |
| 2009/0002821 A1* | 1/2009 | Okano et al. | ................. | 359/485 |

FOREIGN PATENT DOCUMENTS

JP    2004-117482 A    4/2004

* cited by examiner

*Primary Examiner*—Lee Fineman
(74) *Attorney, Agent, or Firm*—Westerman, Hattori, Daniels & Adrian, LLP.

(57) ABSTRACT

A method for producing a polarizing plate of the invention comprises bonding a transparent protective film (A) and another transparent protective film (B) to one side of a polarizer and to another side of the polarizer, respectively, with an adhesive, wherein the polarizer has a moisture content of 15 to 30% by weight, the transparent protective film (A) is made of the same quality material as the transparent protective film (B), the transparent protective film (A) is thicker than the transparent protective film (B), and the transparent protective film (A) has a moisture content higher than that of the transparent protective film (B). The polarizing plate obtained by the production method can suppress curling.

9 Claims, 1 Drawing Sheet

METHOD FOR PRODUCING POLARIZING PLATE, POLARIZING PLATE, OPTICAL FILM, AND IMAGE DISPLAY

BACKGROUND OF THE INVENTION

1. Field of the Invention

The invention relates to a method for producing a polarizing plate. The invention also relates to polarizing plate obtained by the above production method. The polarizing plate may be used alone or in the form of a laminate serving as an optical film to form an image display such as a flat panel display such as a liquid crystal display (hereinafter abbreviated as "LCD") and an electroluminescence display (hereinafter abbreviated as "ELD"), and a plasma display panel.

2. Description of the Related Art

Polarizing plates for use in flat panel displays, especially for use in LCDs, generally use a polyvinyl alcohol-based film as a main raw material. Polarizing plates that are preferably used are produced by a process including the steps of stretching a polyvinyl alcohol-based film containing a dichroic material such as iodine so as to provide sufficient optical properties for LCDs and bonding a transparent protective film to the stretched film. The polyvinyl alcohol-based polarizers are produced through stretching and thus can easily shrink. The polyvinyl alcohol-based film uses a hydrophilic polymer and thus is very apt to be deformed especially under humidified conditions. The mechanical strength of the polyvinyl alcohol-based film itself is also low, and, therefore, there is a problem in which the film can be torn. Thus, there are used polarizing plates reinforced by bonding a transparent protective film to one or both sides of the polarizer. Such polarizing plates are produced by bonding the polarizer and the transparent protective film together with an adhesive. A polyvinyl alcohol-based adhesive, which is an aqueous solution, is generally used for bonding between triacetylcellulose and the polyvinyl alcohol-based polarizer.

In general methods for producing polarizing plates, transparent protective films identical to each other in properties such as physical properties and a thickness are bonded to both sides of a polarizer. In this case, the transparent protective films are arranged in a substantially line-symmetrical manner with respect to the polarizer placed at the center, and, therefore, even if the polarizer contracts, curling will not occur in any direction. In recent years, however, polarizing plates that are configured to include a polarizer and transparent protective films different in physical properties or thickness bonded to both sides of the polarizer have increased. In this case where the transparent protective films provided on both sides of the polarizer are different in physical properties or thickness from each other, the two sides of the polarizer are asymmetrical so that there is a problem in which curling toward one side can occur in the process of producing the polarizing plate. The curled polarizing plate has a problem in which air bubbles can be trapped in the process of bonding it to a liquid crystal cell. As the functionality, brightness and size of LCDs increase, polarizing plates for use in LCDs also have been required to have high handleability, and thus it is desired that curling of polarizing plates should also be suppressed.

When films are bonded, curling is generally controlled by balancing the tensions on the films being bonded to one another. In methods for producing polarizing plates, however, it is difficult to control curling only by the tension control, particularly in the case that transparent protective films different in thickness are used, because the polarizer and transparent protective films are immersed in water in the production process so that addition and removal of water are remarkable and thus swelling and shrinking of the films are caused. A pressure-sensitive adhesive layer protected by a separator is often provided on one side of a polarizing plate, and a surface protection film is often detachably provided on the other side. Alternatively, therefore, curling of a polarizing plate may be controlled by a method of controlling the tension in the process of placing the surface protection film. Although curling can be controlled by this method, however, curling of the polarizing plate itself is not directly controlled by this method so that when the polarizing is bonded to a liquid crystal cell, a force that tries to curl the polarizing plate can act to easily cause stress on the resulting panel.

As a method for suppressing curling when transparent protective films are simultaneously bonded in an asymmetrical manner to both sides of a polarizer to form a polarizing plate, there is proposed a method for producing a polarizing plate that includes: bonding a transparent protective film to one side of a polarizer under a controlled tension such that the transparent protective film can have a flat state after the bonding; and then bonding another transparent protective film to the other side under a controlled tension such that the transparent protective film can have a flat state after the bonding (see JP-A No. 2004-117482). In this method, however, swelling and shrinking of the films frequently occur due to addition and removal of water so that there is a possibility that control of curling is insufficient.

SUMMARY OF THE INVENTION

It is an object of the invention to provide a method for producing a polarizing plate that includes bonding transparent protective films different in thickness to both sides of a polarizer and can suppress curling.

It is another object of the invention to provide a polarizing plate obtained by the above production method. It is a further object of the invention to provide an optical film in which the polarizing plate is laminated and to provide image displays, such as LCDs and ELDs, using the polarizing plate or the optical film.

DETAILED DESCRIPTION OF THE INVENTION

Figure 1:
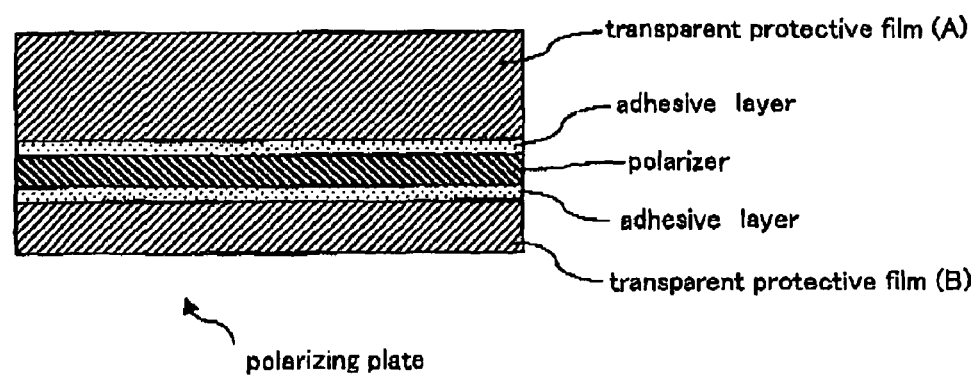
FIG. 1 shows an example of a polarizing plate.

As a result of active investigations for solving the above problems, the inventors have found that the objects can be achieved by the method described below for producing a polarizing plate, and thus have completed the invention. Specifically, the invention is as follows:

The invention relates to a method for producing a polarizing plate, comprising bonding a transparent protective film (A) and another transparent protective film (B) to one side of a polarizer and to another side of the polarizer, respectively, with an adhesive, wherein the polarizer has a moisture content of 15 to 30% by weight, the transparent protective film (A) is made of the same quality material as the transparent protective film (B), the transparent protective film (A) is thicker than the transparent protective film (B), and the transparent protective film (A) has a moisture content higher than that of the transparent protective film (B).

In the method for producing the polarizing plate, a difference between the thicknesses of the transparent protective films (A) and (B) is preferably 20 μm or more.

In the method for producing the polarizing plate, a difference between the moisture contents of the transparent protective films (A) and (B) is preferably 0.5% by weight or more.

In the method for producing the polarizing plate, the transparent protective film (A) and/or the transparent protective film (B) that has an in-plane retardation of 30 nm or more and also serves as a retardation film can be used.

In the method for producing the polarizing plate, as the transparent protective films (A) and (B), triacetylcellulose based materials are preferably used.

The invention also relates to a polarizing plate obtained by the above production method.

The invention also relates to a n optical film, comprising a laminate comprising at least one piece of the above polarizing plate.

The invention also relates to an image display, comprising the above polarizing plate or the above optical film.

In the method for producing a polarizing plate according to the invention, transparent protective films that are made of the same quality material but differ in thickness from each other are used to be bonded to both sides of a polarizing plate. In the method for producing a polarizing plate, the polarizer is bonded to the transparent protective films while containing water and an adhesive is used for the bonding between the polarizer and the transparent protective film. After the bonding, heating and drying may be performed, and during the heating and drying, the polarizer can shrink while water is removed. In this process, the transparent protective films can also shrink. If the transparent protective films differ in thickness, the relatively thin transparent protective film can yield to the shrinkage of the polarizer, even through they are made of the same quality material, because the relatively thin transparent protective film can more significantly shrink and has relatively low strength.

In the method for producing a polarizing plate according to the invention using transparent protective films that are made of the same quality material but differ in thickness from each other, therefore, the moisture content of the polarizer is controlled to be in a specific range, and the moisture contents of the transparent protective films are each adjusted such that a moisture content of the relatively thick transparent protective film is higher than that of the relatively thin transparent protective film, so that the transparent protective films on both sides can be controlled to shrink in substantially the same manner after heating and drying. As described above, according to the invention, the moisture content of the polarizer is controlled to be in a specific range, and the moisture contents of the transparent protective films are controlled depending on the different thicknesses, so that the resulting polarizing plate can be prevented from curling.

In the method for producing a polarizing plate according to the invention, a film having a retardation may be used as the transparent protective film. In this case, the transparent protective film can also serves as a retardation film. When such a retardation film or the like is used as the transparent protective film, the retardation may be appropriately adjusted so that optical properties, such as viewing angle compensation, can be improved, while curling can be controlled.

As a polarizer used in the method of the invention, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine and dye, is absorbed and aligned after stretched is suitably used. Although thickness of polarizer is not especially limited, the thickness of about 5 to 80 μm is commonly adopted.

A polyvinyl alcohol-based film can be formed by means of one of various methods such as a flow method in which a master liquid obtained by dissolving a polyvinyl alcohol-based resin into water or an organic solvent is caused to flow to form a film, a cast method and an extrusion method, and a film formed with a method can be properly employed. A polymerization degree of a polyvinyl alcohol-based resin is preferably in the range of from about 100 to about 5000 and more preferably in the range of from about 1400 to about 4000.

A polarizer obtained by uniaxially stretching a polyvinyl alcohol-based film after being dyed with iodine or the like can be manufactured by means of the following method.

In the dyeing step, a polyvinyl alcohol-based film is immersed in a dyeing bath to which iodine is added at a temperature of in the range of from about 20 to about 70° C. for a time in the range of from about 1 to about 20 minutes to thereby cause iodine to be adsorbed. An iodine concentration in the dyeing bath is usually in the range of from about 0.005 to about 1 part by weight relative to 100 parts by weight of water. A assistant may be added in the dyeing bath in the range of from about 0.02 to about 20 parts by weight and preferably in the range of 2 to 10 parts by weight; example of the assistant include: iodides such as potassium iodine, lithium iodide, sodium iodide, zinc iodide, aluminum iodide, lead iodide, copper iodide, barium iodide, calcium iodide, tin iodide and titanium iodide. The additives are especially preferable in order to enhance a dyeing efficiency. An organic solvent compatible with water can be contained in a small content.

A polyvinyl alcohol-based film may also be subjected to a swelling treatment in a water bath or the like at a temperature in the range of from about 20 to about 60° C. for a time in the range of about 0.1 to about 10 minutes before being dyed in iodine containing aqueous solution. Washing a polyvinyl alcohol-based film also exerts an effect of preventing non-uniformity such as unevenness in dyeing by swelling the polyvinyl alcohol-based film in addition to effects that contaminants and a blocking preventive agent on a surface of the polyvinyl alcohol-based film can be cleaned.

A polyvinyl alcohol-based film to which a dyeing treatment is applied can be crosslinked if necessary. A composition of a crosslinking aqueous solution conducting a crosslinking treatment is such that crosslinking agents such as boric acid, borax, glyoxal and glutaric aldehyde are usually either alone or in mixture added in the range of from about 1 to about 10 parts by weight relative to 100 parts by weight of water. A concentration of a cross linking agent is determined in consideration of a balance between optical characteristics and shrinkage of a polarizing plate caused by a stretching force generated in the polyvinyl alcohol-based film.

An assistant may be added into a crosslinking bath in the range of 0.05 to 15 parts by weight and preferably in the range of from 0.5 to 8 weight %; examples of the assistant includes: iodides such as potassium iodine, lithium iodide, sodium iodide, zinc iodide, aluminum iodide, lead iodide, copper iodide, barium iodide, calcium iodide, tin iodide and titanium iodide. The additives are especially preferable since uniform in-plane characteristics of a polarizer can be obtained. A temperature of an aqueous solution is usually in the range of from about 20 to about 70° C. and preferably in the range of from 40 to 60° C. No specific limitation is imposed on an immersion time, but an immersion time is usually in the range of from about 1 second to about 15 minutes and preferably in the range of from 5 seconds to 10 minutes. An organic solvent compatible with water may be contained in a small quantity in addition to a water solvent.

A total stretch ratio of a polyvinyl alcohol-based film is about 3 to about 7 times, preferably 5 to 6 times as large as the original length. If a total stretch ratio exceeds 7 times, the film is easier to be broken. Stretching may be conducted after being dyed with iodine, while being dyed or while being crosslinked, or followed by dyeing with iodine. A stretching method and the number of times of stretching are not specifically limited and stretching may be conducted only in one step. Alternatively, plural times of stretching may be conducted in the same step.

A polyvinyl alcohol-based film to which an iodine adsorption orientation treatment is applied can be further subjected to a step of immersing the film in an aqueous solution of an iodide such as potassium iodide with a concentration in the range of from 0.1 to 10 mass % at a temperature in the range of from about 10 to about 60° C. and preferably on the order in the range of from 30 to 40° C. for a time in the range of from 1 second to 1 minute. An assistant such as zinc sulfate or zinc chloride may be added into an iodide aqueous solution. A polyvinyl alcohol-based film to which an iodine adsorption orientation treatment is applied can be subjected to water washing step and a drying step at a temperature in the range of about 20 to about 80° C. for a time in the range of from about 1 minute to about 10 minutes.

The polarizer to be used has a moisture content of 15 to 30% by weight. Using the polarizer with a moisture content in this range can suppress curling of the polarizing plate, even when transparent protective films different in thickness are used. If the moisture content is too low, the polarizer can tend to easily tear. If the moisture content is too high, suppression of curling can tend to be impossible. From these points of view, the moisture content is preferably from 15 to 28% by weight, more preferably from 20 to 25% by weight.

The moisture content of the polarizer may be adjusted by controlling the time of immersion of the raw film in each bath in each process and controlling the drying temperature and drying time in the final drying process.

In the present invention, a transparent protective film (A) is provided on one side of the polarizer, and another transparent protective film (B) made of the same quality material as the transparent protective film (A) is provided on the other side of the polarizer. Proper transparent materials may be used as a transparent polymer or a film material that forms the transparent protective file, and the material having outstanding transparency, mechanical strength, heat stability and outstanding moisture interception property, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film is formed as a cured layer made of heat curing type or ultraviolet ray curing type resins, such as acryl based, urethane based, acryl urethane based, epoxy based, and silicone based, or the like.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

In view of polarizing properties and durability, the transparent protective film is preferably made of a cellulose type polymer such as triacetylcellulose. A triacetylcellulose film is particularly preferred.

The transparent protective films (A) and (B) are made of the same quality material. The transparent protective film (A) to be used has a thickness larger than that of the transparent film (B) to be used. The transparent protective film (A) to be used also has a moisture content higher than that of the transparent protective film (B) to be used. If this relationship between the moisture contents of the transparent protective films (A) and (B) to be used is satisfied, curling of the polarizing plate can be suppressed even when the transparent films to be used differ in thickness from each other.

In view of strength, workability such as handleability, thin layer formability, and the like, the thickness of each of the transparent protective films (A) and (B) is generally selected in the range of 1 to 500 μm, preferably in the range of 20 to 100 μm, such that the above relationship can be satisfied. The difference in thickness between the transparent protective films (A) and (B) may be 20 μm or more. In such a case, the invention is preferably applied, and curing of the polarizing plate can be suppressed, even though the thickness difference is relatively large. The thickness difference is preferably from 20 to 80 μm, more preferably from 30 to 50 μm. A too large thickness difference is not preferred in terms of suppressing curling.

In general, the transparent protective film (A) preferably has a thickness of 20 to 100 μm, more preferably of 40 to 90 μm. While, in general, the transparent protective film (B) preferably has a thickness of 20 to 80 μm, more preferably of 20 to 50 μm.

The moisture content of each of the transparent protective films (A) and (B) is preferably selected in the range of 0.1 to 4% by weight, more preferably in the range of 0.1 to 3% by weight, so as to satisfy the above relationship, while it may be controlled as appropriate. The difference in moisture content between the transparent protective films (A) and (B) is preferably 0.5% by weight or more in terms of suppressing curling of the polarizing plate. The moisture content difference is more preferably from 0.5 to 4% by weight, still more preferably from 1 to 3% by weight, yet more preferably from 1.2 to 2% by weight. If the moisture content difference is too small, the curl reducing effect can be unfavorably low. If the moisture content difference is too large, the film lubricity can be unfavorably degraded.

The transparent protective film (A) preferably has a moisture content of 0.1 to 4% by weight, more preferably of 1 to 4% by weight. While the transparent protective film (B) preferably has a moisture content of 0.1 to 4% by weight, more preferably of 0.1 to 2% by weight.

The moisture content of each of the transparent protective films (A) and (B) may be controlled by means of the tension balance, the film type, and a combination thereof in the process of bonding the transparent film to the polarizer. For example, the moisture content of each of the transparent protective films (A) and (B) may also be adjusted by controlling the drying temperature, air volume, time, surrounding humidity, or the like in the process of preparing the transparent protective film, or by controlling the immersion time of the alkali treatment (saponification treatment) described later or the temperature and time of drying performed thereafter.

The ratio (A/B) of the thickness of the transparent protective film (A) to that of the transparent protective film (B) is preferably in the range of 1.5 to 4, more preferably in the range of 1.6 to 2.5. The ratio (A/B) of the moisture content of the transparent protective film (A) to that of the transparent protective film (B) is preferably in the range of 1.5 to 30, more preferably in the range of 5 to 15.

The surface of the transparent protective film to be bonded to the polarizer may be subjected to an adhesion facilitating treatment. Examples of the adhesion facilitating treatment include a dry treatment such as plasma treatment and corona treatment, chemical treatment such as an alkali treatment, and a coating treatment for forming an adhesion facilitating layer with any of various types of adhesion facilitating materials such as polyol resins, polycarboxylic acid resins and polyester resins. In particular, a chemical treatment such as an alkali treatment (saponification) is preferred. For example, alkali treatment may be performed by immersing the transparent protective film at 40 to 80° C. for 10 to 60 seconds in an aqueous alkali solution containing an alkali metal hydroxide, such as sodium hydroxide or potassium hydroxide, dissolved at a concentration of about 5 to about 15% by weight. Alkali treatment is preferred when the material for the transparent protective film is a cellulose-based material.

In general, each of the transparent protective films (A) and (B) to be used has substantially no retardation. In-plane retardation Re is expressed by the equation: $Re=(nx-ny) \cdot d$, wherein nx is a refractive index in the slow axis direction in the film plane, ny is a refractive index in the direction perpendicular to the nx direction, and d is a film thickness. When the transparent protective films to be used have substantially no retardation, their in-plane retardation is preferably less than 30 nm, more preferably 10 nm or less, still more preferably 3 nm or less. The transparent protective films to be used should be as colorless as possible. In this point of view, the transparent protective films to be used preferably have a retardation of −90 nm to +75 nm in the film thickness direction. The retardation Rth in the film thickness direction is expressed by the equation: $Rth=(nx-nz)d$, wherein nx is the refractive index in the slow axis direction in the film plane, nz is the refractive index in the film thickness direction, and d is the film thickness. If the transparent protective films to be used have a retardation (Rth) of −90 nm to +75 nm in the film thickness direction, coloration (optical coloration) of the polarizing plate, which would otherwise be caused by the transparent protective film, can be almost eliminated. The retardation (Rth) in the thickness direction is more preferably from −80 nm to +60 nm, particularly preferably from −70 nm to +45 nm.

Alternatively, if the transparent protective film (A) or (B) has a retardation, it may be used as a retardation film. When the polarizing plate obtained according to the invention is placed on a liquid cell, the transparent protective film (B) side is generally placed on the liquid cell side, because the transparent protective film (B) is thinner than the transparent protective film (A). In this case, by using the transparent protective film (B) having a retardation, optical properties can be improved. The transparent protective film to be used may be appropriately selected so as to have an in-plane retardation of 30 nm or more, preferably of about 30 to about 400 nm. In particular, the in-plane retardation is preferably from 40 to 60 nm. On the other hand, the transparent protective film to be used may have a retardation of 75 to 600 nm, preferably of 100 to 300 nm, in the thickness direction. In particular, the retardation in the thickness direction is preferably from 130 to 150 nm.

Even when the transparent protective film (A) or (B) also serves as a retardation film, the transparent protective film (B) is made of the same quality material as the transparent protective film (A). In such a case, examples of methods to give a retardation to the transparent protective film (B) include a method such as stretching the prepared film to give a retardation thereto and a method including adding an additive to a polymer material in the process of preparing the film so that the resulting film can have a retardation.

An adhesive is generally used to bond the transparent protective films (A) and (B) to the polarizer. The adhesive to be used is generally a water-based adhesive. Examples of the water-based adhesive include isocyanate adhesives, polyvinyl alcohol adhesives, gelatin adhesives, vinyl latex adhesives, water-based polyurethane adhesives, and water-based polyester adhesives. In particular, polyvinyl alcohol adhesives are preferably used. If necessary, a crosslinking agent can be added to the water-based adhesive.

The adhesive (such as a polyvinyl alcohol adhesive including a case that a crosslinking agent is contained) is generally used in the form of an aqueous solution. In view of coatability, storage stability and the like, the concentration of the aqueous solution should be, but not limited to, from about 0.1 to about 15% by weight, preferably from about 0.5 to about 10% by weight, more preferably from about 0.5 to about 5% by weight.

In addition, various additives described below can be further mixed into the above adhesive: coupling agents such as a silane coupling agent and a titanium coupling agent; various kinds of tackifiers; an ultraviolet absorbent; an antioxidant; stabilizers such as a heat resistance stabilizer and a hydrolysis resistance stabilizer; and the like.

In the method for producing the polarizing plate according to the invention, the adhesive may be applied to any one or both of the polarizer and the transparent protective film, when the polarizer is bonded to the transparent protective films (A) and (B) with the adhesive. The application may be performed using any of various methods such as a roll method, a spray method and an immersion method. The adhesive is preferably applied such that the thickness of the adhesive layer formed after drying can reach about 30 to about 200 nm. The thickness of the adhesive layer is more preferably from 40 to 100 nm. When the polarizer is bonded to the transparent protective film, a tension may be applied to the film. However, the tension is preferably as low as possible, because it can distort the film.

After the adhesive is applied, the polarizer and the transparent protective films may be laminated with a roll laminator or the like. After the lamination, the laminate may be subjected to a drying process so that an adhesive layer made of a dried coating layer can be formed. The drying may be performed at a temperature of about 5 to about 150° C., preferably of 30 to 120° C., for 120 seconds or more, preferably for 300 seconds or more.

The other side of the transparent protective film where no polarizer is bonded may be subjected to the formation of a hard coat layer or subjected to an antireflection processing, an sticking prevention processing t, or a processing for diffusion or antiglare properties. Such layers are preferably formed on the transparent protective film (A).

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an antiglare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the transparent protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, antiglare layer, etc. may be built in the transparent protective film itself, and also they may be prepared as an optical layer different from the transparent protective film.

A polarizing plate of the invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the transparent protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarizing plate or circularly polarizing plate in which the retardation plate is laminated to the polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film or the like may be used. As tilt orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film can be suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an tilt orientation layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a back-light. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of the optical layer being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the polarizing plate or the optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 500 µm, preferably 5 to 200 µm, and more preferably 1 to 100 µm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer of the invention, such as the polarizer and the transparent protective film for the polarizing plate, the optical film and the pressure-sensitive layer etc., using a method of adding UV absorbents, such as salicylic acid ester type compounds, benzophenol type compounds, benzotriazol type compounds, cyano acrylate type compounds, and nickel complex salt type compounds.

The polarizing plate and the optical film of the invention are preferably used to form various types of image displays such as liquid crystal displays. Liquid crystal displays may be formed according to conventional techniques. Specifically, liquid crystal displays are generally formed by appropriately assembling a liquid crystal cell and the polarizing plate or the optical film and optionally other components such as a lighting system and incorporating a driving circuit according to any conventional technique, except that the polarizing plate or the optical film of the invention is used. Any type of liquid crystal cell may also be used such as a TN type, an STN type and a π type.

Suitable liquid crystal displays, such as liquid crystal display with which the above-mentioned the polarizing plate or the optical film has been located at one side or both sides of the liquid crystal cell, and with which a backlight or a reflective plate is used for a lighting system may be manufactured. In this case, the polarizing plate or the optical film of the present invention may be installed in one side or both sides of the liquid crystal cell. When installing the polarizing plate or the optical film in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The feature and advantage of the invention are more specifically described below with some examples and so on.

(Moisture Content of Polarizer and Transparent Protective Film)

A sample (100×100 mm in size) was cut out from the polarizer or the transparent protective film, and the initial weight of the sample was measured. The sample was then dried at 120° C. for 2 hours and measured for dry weight. The moisture content was determined according to the following formula: moisture content (% by weight)={(the initial weight−the dry weight)/the initial weight}×100. The measurement of each weight was performed three times, and the average value thereof was used.

Example 1

(Preparation of Polarizer)

A 75 μm-thick polyvinyl alcohol film with an initial original width of 3100 mm (VF-PS7500, manufactured by Kuraray Co., Ltd.) was stretched to 3.5 times while immersed in pure water at 30° C. for 60 seconds. The film was then dyed in an aqueous iodine solution (pure water/iodine/potassium iodide=100/0.01/1 in weight ratio) at 30° C. for 80 seconds such that it had a single piece transmittance in the range of 42.8±0.1%. Subsequently, the film was immersed in an aqueous solution containing 3% by weight of boric acid and 2% by weight of potassium iodide, and then stretched to 5.8 times in an aqueous solution containing 4% by weight of boric acid and 3% by weight of potassium iodide. Thereafter, the film was immersed in an aqueous solution of 3.5% by weight potassium iodide and then wiped dry. The film was then dried at 40° C. for 2 minutes while maintaining the tension, so that a 28 μm-thick polarizer was obtained. The resulting polarizer had a moisture content of 23%.

(Adhesive)

A polyvinyl alcohol resin (completely saponified) was dissolved in pure water at a temperature of 30° C. to form an aqueous solution with an adjusted solids content of 3%. The aqueous solution was used as an adhesive.

(Transparent Protective Films)

An 80 μm-thick, 1330 mm-wide, saponified triacetylcellulose film was used as the transparent protective film (A). The moisture content of the transparent protective film (A) was adjusted to 3.2% by weight.

A 40 μm-thick, 1330 mm-wide, saponified triacetylcellulose film was used as the transparent protective film (B). The moisture content of the transparent protective film (B) was adjusted to 2.4% by weight.

The moisture content of each of the transparent protective films (A) and (B) was adjusted by heating and drying for 30 seconds under temperature control after the saponification (immersion in an aqueous solution of 10% by weight sodium hydroxide at 60° C. for 30 seconds).

(Preparation of Polarizing Plate)

The polyvinyl alcohol-based adhesive described above was applied to both sides of the polarizer with the above moisture content such that the adhesive layer would have a thickness of 50 nm after drying. Thereafter, the transparent protective films (A) and (B) each with the above moisture content were bonded to the polarizer with no tension applied and then dried at 75° C. for 4 minutes to form a polarizing plate.

Examples 2 to 9 and Comparative Examples 1 to 4

Polarizing plates were prepared using the process of example 1, except that the thickness or moisture content of the transparent protective film (A) or (B) or the moisture content of the polarizer was changed as shown in table 1.

(Evaluation)

The polarizing plates obtained in the examples and the comparative examples were evaluated as described below. The results are shown in table 1.

(Amount of Curling)

Each prepared polarizing plate was cut along the feeding direction into an A4-size piece (with a long side in the feeding direction). The piece was placed on a horizontal plate in an environment at a temperature of 23° C. and a humidity of 60% R.H. and allowed to stand for 1 hour. Thereafter, the amount of curling was measured with a ruler. The larger the size of the polarizing plate, the larger its own weight, and thus the smaller the amount of curling is. If the amount of curing is in the range of −10 to +10 mm for the A4 size, therefore, the amount of curling for the larger size does not exceed 10 mm. Since the required amount of curling for 32-inch size polarizing plates, which are the mainstream for TVs today, is ±10 mm, the amount of curling may be evaluated with reference to this value.

The length of a portion that had a maximum distance between the edge of the polarizing plate and the horizontal plate was defined as the amount of curling (mm). Curling toward the transparent protective film (A) side making the transparent protective film (B) side convex was defined as (+) curling, while curling toward the transparent protective film (B) side making the transparent protective film (A) side convex was defined as (−) curling.

TABLE 1

| | Transparent Protective Film (A) | | Transparent Protective Film (B) | | Moisture Content (%) | | | Amount of Curling (mm) |
|---|---|---|---|---|---|---|---|---|
| | Material | Thickness (μm) | Material | Thickness (μm) | Transparent Protective Film (A) | Transparent Protective Film (B) | Polarizer | |
| Example 1 | TAC | 80 | TAC | 40 | 3.2 | 2.4 | 23 | −7 |
| Example 2 | TAC | 80 | TAC | 40 | 3.2 | 1.6 | 23 | 0 |
| Example 3 | TAC | 80 | TAC | 40 | 3.2 | 0.7 | 23 | +2 |
| Example 4 | TAC | 80 | TAC | 40 | 3.2 | 1.6 | 25 | −5 |
| Example 5 | TAC | 80 | TAC | 40 | 3.2 | 1.6 | 27 | −6 |
| Example 6 | TAC | 80 | TAC | 40 | 3.2 | 1.6 | 30 | −8 |
| Example 7 | TAC | 80 | TAC | 40 | 3.2 | 1.6 | 20 | +7 |
| Example 8 | TAC | 80 | TAC | 40 | 3.2 | 1.6 | 17 | +9 |
| Example 9 | TAC | 80 | TAC | 40 | 2.6 | 1.6 | 23 | −4 |
| Comparative Example 1 | TAC | 80 | TAC | 40 | 3.2 | 3.2 | 23 | Incapable Measurement (Tubular) |
| Comparative Example 2 | TAC | 80 | TAC | 40 | 3.2 | 1.6 | 32 | −12 |
| Comparative Example 3 | TAC | 80 | TAC | 40 | 3.2 | 1.6 | 13 | Impossible to Make Polarizing Plate |
| Comparative Example 4 | TAC | 80 | TAC | 40 | 2.5 | 2.5 | 23 | Incapable Measurement (Tubular) |

As shown in table 1, the amount of curling in each example is within ±10 mm and complies with the required amount of curling for the 32-inch size.

What is claimed is:

1. A method for producing a polarizing plate, comprising bonding a transparent protective film (A) and another transparent protective film (B) to one side of a polarizer and to another side of the polarizer, respectively, with an adhesive, wherein
   the polarizer has a moisture content of 15 to 30% by weight,
   the transparent protective film (A) is made of the same quality material as the transparent protective film (B),
   the transparent protective film (A) is thicker than the transparent protective film (B), and
   the transparent protective film (A) has a moisture content higher than that of the transparent protective film (B).

2. The method according to claim 1, wherein a difference between the thicknesses of the transparent protective films (A) and (B) is 20 μm or more.

3. The method according to claim 1, wherein a difference between the moisture contents of the transparent protective films (A) and (B) is 0.5% by weight or more.

4. The method according to claim 1, wherein the transparent protective film (A) and/or the transparent protective film (B) has an in-plane retardation of 30 nm or more and also serves as a retardation film.

5. The method according to claim 1, wherein the transparent protective films (A) and (B) are based on triacetylcellulose.

6. A polarizing plate produced by the method according to claim 1.

7. An optical film, comprising a laminate comprising at least one piece of the polarizing plate according to claim 6.

8. An image display, comprising the polarizing plate according to claim 6.

9. An image display, comprising the optical film according to claim 7.

* * * * *